United States Patent [19]
Craig

[11] Patent Number: 5,615,396
[45] Date of Patent: Mar. 25, 1997

[54] PRODUCING SMOOTHLY BLENDED DOUBLE EXPOSURE COMPOSITE IMAGES

[75] Inventor: Robert L. Craig, Pfafftown, N.C.

[73] Assignee: Photo Dimensions, Winston Salem, N.C.

[21] Appl. No.: 670,352

[22] Filed: Jun. 25, 1996

[51] Int. Cl.⁶ .............. G03B 1/00; G03B 11/00; G03B 17/02; G03B 17/24
[52] U.S. Cl. .............. 396/6; 396/322; 396/535; 396/545
[58] Field of Search .............. 354/105, 106, 354/107, 108, 109, 110, 120, 125, 288, 295, 296, 122; 355/77, 125

[56] References Cited

U.S. PATENT DOCUMENTS

| | | |
|---|---|---|
| 360,314 | 3/1887 | Lewis . |
| 547,855 | 10/1895 | Lee . |
| 1,268,609 | 6/1918 | Powell . |
| 3,665,828 | 5/1972 | Reiter ............... 354/110 |
| 3,815,147 | 3/1973 | Wick et al. ............... 354/203 |
| 3,928,863 | 12/1975 | Stewart et al. ............... 354/109 |
| 4,268,144 | 5/1981 | Wheeler ............... 354/108 |
| 4,310,232 | 1/1982 | Reed ............... 354/125 |
| 4,352,555 | 10/1982 | Dobbs et al. ............... 355/77 |
| 4,357,102 | 11/1982 | Taren et al. ............... 355/77 |
| 4,427,279 | 1/1984 | Edelstein et al. ............... 354/107 |
| 4,652,104 | 3/1987 | Harvey ............... 354/106 |
| 4,665,570 | 5/1987 | Jaffe ............... 354/107 |
| 4,707,106 | 11/1987 | Johnson et al. ............... 354/481 |
| 4,717,930 | 1/1988 | Wheeler ............... 354/108 |
| 4,764,782 | 8/1988 | Wheeler ............... 354/109 |
| 4,801,957 | 1/1989 | Vandenmoere ............... 354/147 |
| 4,816,848 | 3/1989 | Doyle, Jr. ............... 354/108 |
| 4,827,291 | 5/1989 | Guez ............... 354/125 |
| 4,894,671 | 1/1990 | Wheeler ............... 354/108 |
| 4,896,176 | 1/1990 | Barrett ............... 354/122 |
| 4,942,412 | 7/1990 | Wheeler ............... 354/125 |
| 4,994,832 | 2/1991 | Spector ............... 354/110 |
| 5,111,224 | 5/1992 | Spector ............... 354/125 |
| 5,142,311 | 8/1992 | Olson et al. ............... 354/120 |
| 5,187,512 | 2/1993 | Kirkendall ............... 354/120 |
| 5,189,467 | 2/1993 | Wheeler ............... 354/110 |
| 5,192,648 | 3/1993 | Burnham ............... 430/496 |
| 5,247,320 | 9/1993 | Oi et al. ............... 354/83 |
| 5,343,265 | 8/1994 | Oi et al. ............... 354/222 |
| 5,425,840 | 6/1995 | Ferrante ............... 354/106 |
| 5,486,885 | 1/1996 | Matsumoto ............... 216/83 |
| 5,546,146 | 8/1996 | Dobbs et al. ............... 354/120 |

FOREIGN PATENT DOCUMENTS

| | | |
|---|---|---|
| 2321463 | 4/1972 | Japan . |
| 3290643 | 12/1991 | Japan . |
| 2237120 | 4/1991 | United Kingdom . |

Primary Examiner—A. A. Mathews
Attorney, Agent, or Firm—Merchant, Gould, Smith, Edell, Welter & Schmidt

[57] ABSTRACT

A portion of a frame of film is pre-exposed to a first image by subjecting the film to a low intensity exposure while masking a portion of the film. The film is then used in a conventional camera along with a non-opaque exposure limiting device. The non-opaque exposure limiting device is positioned between the camera lens and the film. During exposure of the film to a second or target image, the first image is partially re-exposed thereby enhancing the stability of the picture while capturing the target image on the unexposed portion of the frame of film. The two images are then developed in a conventional manner to produce a relatively smoothly blended composite photograph.

37 Claims, 6 Drawing Sheets

PRODUCING SMOOTHLY BLENDED DOUBLE EXPOSURE COMPOSITE IMAGES

BACKGROUND OF THE INVENTION

1. Field of the Invention

This invention relates to making multiple exposure photographic images. In particular the film is subjected to two or more images at different times and then developed simultaneously in a conventional manner.

2. Description of the Prior Art

Several procedures have been developed to create composite photographs by exposing film to multiple images. Techniques for creating composite images have either been aimed at directing two images to different parts of the film during a single exposure or using a system of masking different parts of the film during multiple exposures.

The latter technique involves exposing the film to a first image while masking off a remaining portion of the film. This prevents the remaining portion from being exposed. Prior to exposing the film to a second image, the first exposed portion of the film is masked off in a light-tight manner. portion of the film is masked off in a light-tight manner. Again this prevents re-exposure when the second image is exposed to the unexposed portion of the film. Thus, no single portion of the film is exposed more than once.

The inherent problems with this technique are twofold. First, the periphery of the two images must be strictly aligned. Aligning the two images prevents visible lines from forming between the two images caused by over-exposure or under-exposure of any part of the film. Second, any under-exposure or over-exposure that occurs while taking the second image cannot be easily corrected. Any correction during development could adversely affect either the first or second exposed image. Consequently, the images will not be smoothly blended into a composite image.

SUMMARY OF THE INVENTION

This invention combines two images onto the same frame of a film in a single photograph in a way that minimizes the known problems in the prior art of poor image blending and visible lines of demarcation between images.

This invention utilizes a camera, pre-exposed film and a non-opaque exposure limiting device to uniquely create a composite photograph that more aesthetically blends two images.

Part of each film frame is first exposed to a first image at a reduced exposure while the remaining part of the frame is masked off so that it remains unexposed. The film is then loaded into a camera. A non-opaque exposure limiting device is positioned between the first exposed portion of each frame and the camera's lens. A non-opaque exposure limiting device is a non-opaque element for reducing light intensity preferably between about one and about two fStop. The exposure limiting device reduces the intensity of the exposure the first exposed portion of the film receives when the film is exposed to a second image, namely the target image. Thus, the first image is at least partly re-exposed.

The exposure limiting device does not completely mask the first exposed image as described in the prior art. Instead the exposure limiting device allows sufficient light to further re-expose the first exposed area of the film. The images are then simultaneously developed as a single image.

The exposure limiting device is installed into the exposure aperture frame of a camera in a manner that permits removal. The exposure limiting device may be one or multiple components.

Smooth image blending is possible because the picture is stabilized by subjecting the two images to the same second light source. Thus, an under or over exposure of the second image will cause the same effect in the first exposed image and the corrections to the second image made while exposing the film will necessarily correct both images.

Visible lines of demarcation between the two images are less noticeable because the first exposed image is initially exposed to a low intensity exposure. Thus, if the exposure limiting device is not precisely positioned such that the first exposed portion of the film receives the full intensity while exposing the second image, the effect will be less pronounced than a double exposure at full intensity as occurs in the prior art.

The invention is directed to the photographic apparatus, camera, the exposure limiting device, a method, and the film for use in the photographic apparatus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

In order to obtain a fuller and more precise understanding of the nature and design of this invention, reference should be made to the following detailed description taken in connection with the following drawings.

DETAILED DESCRIPTION OF THE PREFERRED EMBODIMENTS

In the following description of the preferred embodiment, reference is made to the accompanying drawings which form a part and in which is shown by way of illustration a specific embodiment in which the invention may be practiced. It is to be understood that other embodiments may be utilized and structural changes may be made without departing from the scope of the present invention.

The preferred embodiment of this invention produces a relatively smoothly blended composite photograph of two or more images from a conventional camera, a roll of pre-exposed film and a non-opaque exposure limiting device. The first image may be available in a variety of stylized designs including decorative borders, message banners or company names and logos from the film manufacturer. These stylized designs can be positioned along any border of a frame or a combination of borders by the manufacturer. The manufacturer pre-exposes only the portion of the film that will contain the desired image. The remaining portion of the frame of the film is covered by a mask to prevent exposure.

At this point the film is packaged in light-tight containers and sold in conventional lengths, i.e., consisting of twelve, twenty-four or thirty-six exposures. If the camera is disposable or single-use the film is assembled with the camera instead of being sold separately.

The second or target image is later captured on the unexposed portion of the frame much like conventional single exposure photography. The film is then processed in a conventional manner.

In the case of a disposable camera the entire camera with the film inside is sent to the film developer for processing. Thereafter the developer sends the camera without the film for recycling, namely reloading of the camera with new or pre-exposed film. The camera is then reused.

Figure 1:
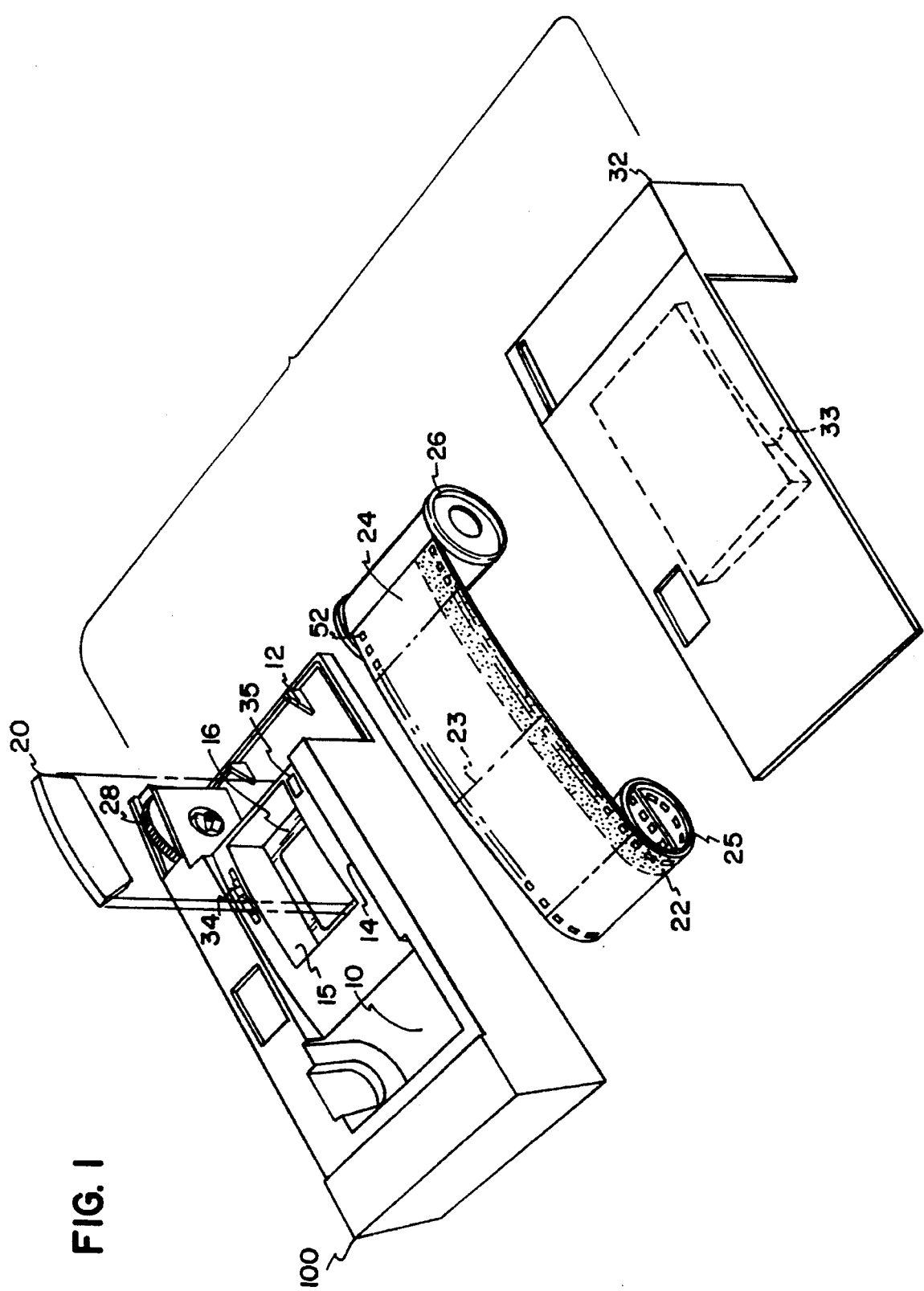
FIG. 1 is an exploded view of a camera, pre-exposed film and an exposure limiting device used in one embodiment of this invention.

FIG. 1 illustrates an exploded view of a camera 100, pre-exposed film 25 and a non-opaque exposure limiting device 20 (see also FIG. 5A) in accordance with one embodiment of this invention. The camera 100 has two cavities 10 and 12 for holding the pre-exposed film 25. One cavity 10 holds the pre-exposed film 25 prior to re-exposure and the other cavity 12 holds the film 25 with a take-up spool 40 (see FIG. 2) in a light-tight cassette 26 after re-exposure. The cavities 10 and 12 are located on opposite sides of the exposure aperture frame 14. The exposure aperture frame 14 surrounds the camera lens 44 (see FIG. 2) through which the light reflected from the target image passes onto the unexposed portion 24 of the pre-exposed film 25. The target image being focused onto the unexposed portion 24 of the film 25 by a lens 44 (see FIG. 2).

The film 25 is a fixed length and, after an exposure, defines a plurality of frames 23. Each frame being of the same size and of fixed length. Perforated holes 52 are located at the top and bottom edges of the film running along the entire length of the film 25. The holes 52 fit onto the sprocket 34 used to advance the film 25.

The film 25 contains a first exposed image on a portion 22 of the film 25 within a space to be formed as part of the frame 23. The portion 24 of the film 25 not containing the first exposed image is the unexposed portion 24 onto which the target image is focused. The film 25 is encased in a light-tight container 26 to prevent re-exposure after the exposure to the first exposed image and before exposure to the target image.

Each frame 23 of the pre-exposed film 25 is aligned with the exposure aperture frame 14 when the pre-exposed film 25 is loaded into the camera 100. The film 25 is aligned with the exposure aperture frame 14 by extending the film 25 across the exposure aperture frame 14 and onto the take-up spool 40 until a cut-out (not shown) in the film is aligned with a fixed mark 35 on the exposure aperture frame 14. In addition to aligning the film 25 with the lens 44, this also aligns the non-opaque exposure limiting device 20 with the pre-exposed portion 22 of the film 25.

The camera 100 includes means for advancing 28 the film 25 whereby the film 25 traverses from the exposure aperture frame 14 to the take-up spool 40 after re-exposure of a frame 23 of the film 25. The means for advancing the film 28 is operatively coupled to a sprocket 34 located on the exposure aperture frame 14. As the means for advancing the film 28 is rotated, the take-up spool 40 and sprocket 34 advance the film 25 while keeping it aligned to the exposure aperture frame 14. The take-up spool 40 is encased in a light-tight container 26 to prevent any subsequent re-exposure.

The non-opaque exposure limiting device 20 is attached at various locations to an opaque support bracket 16. The opaque support bracket 16 is positioned in the area 15 between the lens 44 and the film 25. This area 15 being defined as the exposure aperture housing 15. The installation of the support bracket 16 into the exposure aperture housing 15 effectively reduces the amount of light passing from the lens 44 onto the film 25.

The translucent diffuser 20 only partially reduces the exposure intensity to the pre-exposed area 22 of the film 25 thereby permitting re-exposure of the pre-exposed area 22 of each frame 23 of the film 25. The translucent diffuser 20 can be manufactured to permit varying degrees of re-exposure of the pre-exposed area 22 of the film 25. The amount of re-exposure permitted by the translucent diffuser 20 will depend upon the amount required by the pre-exposed image on the film 25 to produce a relatively smoothly blended composite photograph.

The correct diffuser 20 could be selected by the manufacturer of the camera 100 at the time the camera 100 and or film 25 are assembled. Thus, each translucent diffuser 20 will correlate to a specific pre-exposed image.

The camera 100 is sealed in a light-tight manner with a back cover 32. The back cover 32 has a pressure plate 33 that firmly presses the film 25 against the exposure aperture frame 14. This helps to keep the film 25 correctly aligned with the camera lens 44.

Figure 2:
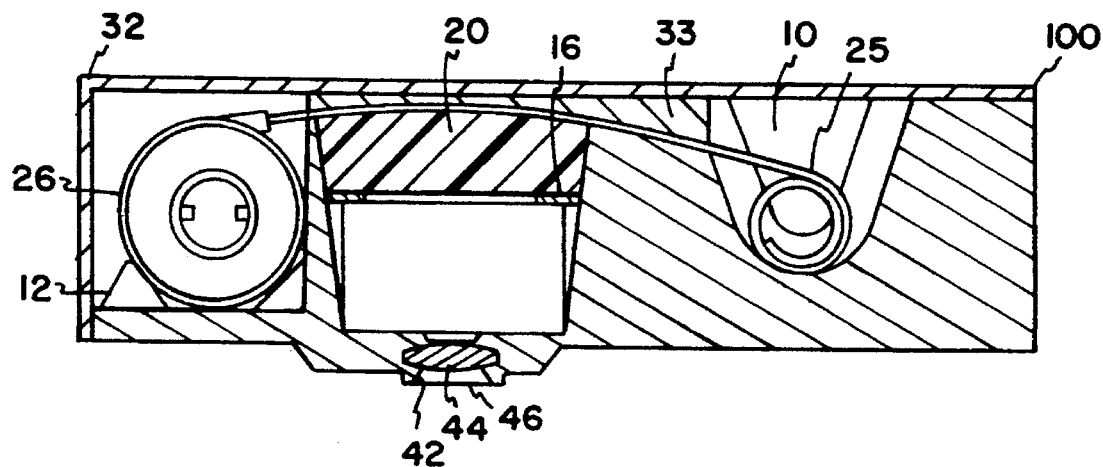
FIG. 2 is a section view taken along line 2—2 of FIG. 3.
Figure 3:
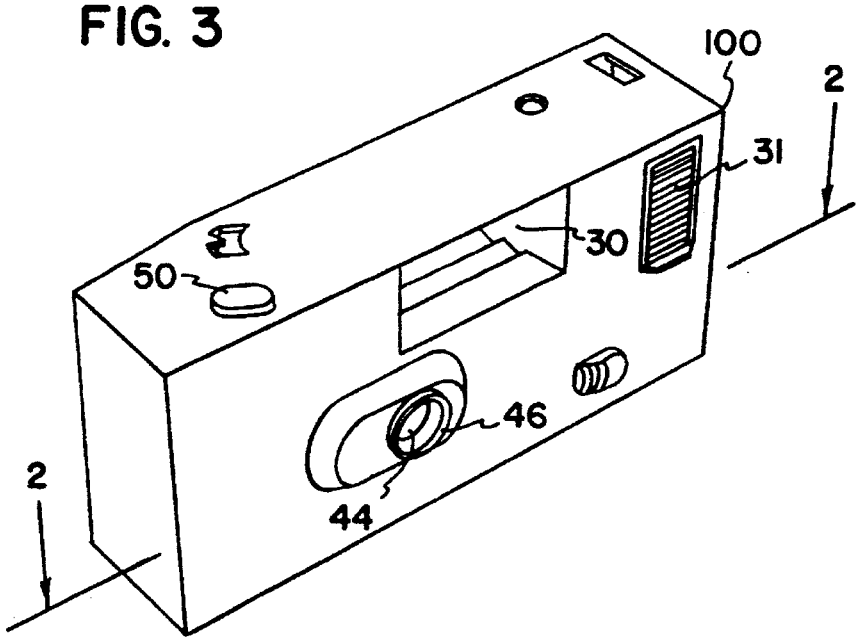
FIG. 3 is a perspective view of a camera used in one embodiment of this invention.

FIG. 2 is a section view of FIG. 3 taken along lines 2—2. The diagrams shows the photography apparatus as it would look when in use. Light reflected from a target image enters the camera 100 at the lens opening 46, passes through the lens 44 which focuses the target image onto the unexposed portion 24 of the film 25. After the light passes through the lens 44 and before the light passes onto the film 25, the opaque support bracket 16 masks out light that would expose areas outside the periphery of each frame 23 of the film 25. Then, the translucent diffuser 20 partially reduces the light only to the pre-exposed portion 22 of the film 25.

FIG. 3 is a perspective view of a camera 100 used in one embodiment of this invention. In addition to the elements described in FIG. 1, the camera 100 includes a viewfinder 30 to allow the user to focus the camera 100 on the target image. The shutter 42 (see FIG. 2) covers the lens 44 in a light-tight manner when the camera 100 is not being used. Upon pressing the shutter control button 50 the shutter uncovers the lens 44 thereby permitting exposure of the target image onto the pre-exposed film 25. The camera 100 also contains a flash 31 when additional light is necessary to illuminate the target image.

Figure 4:
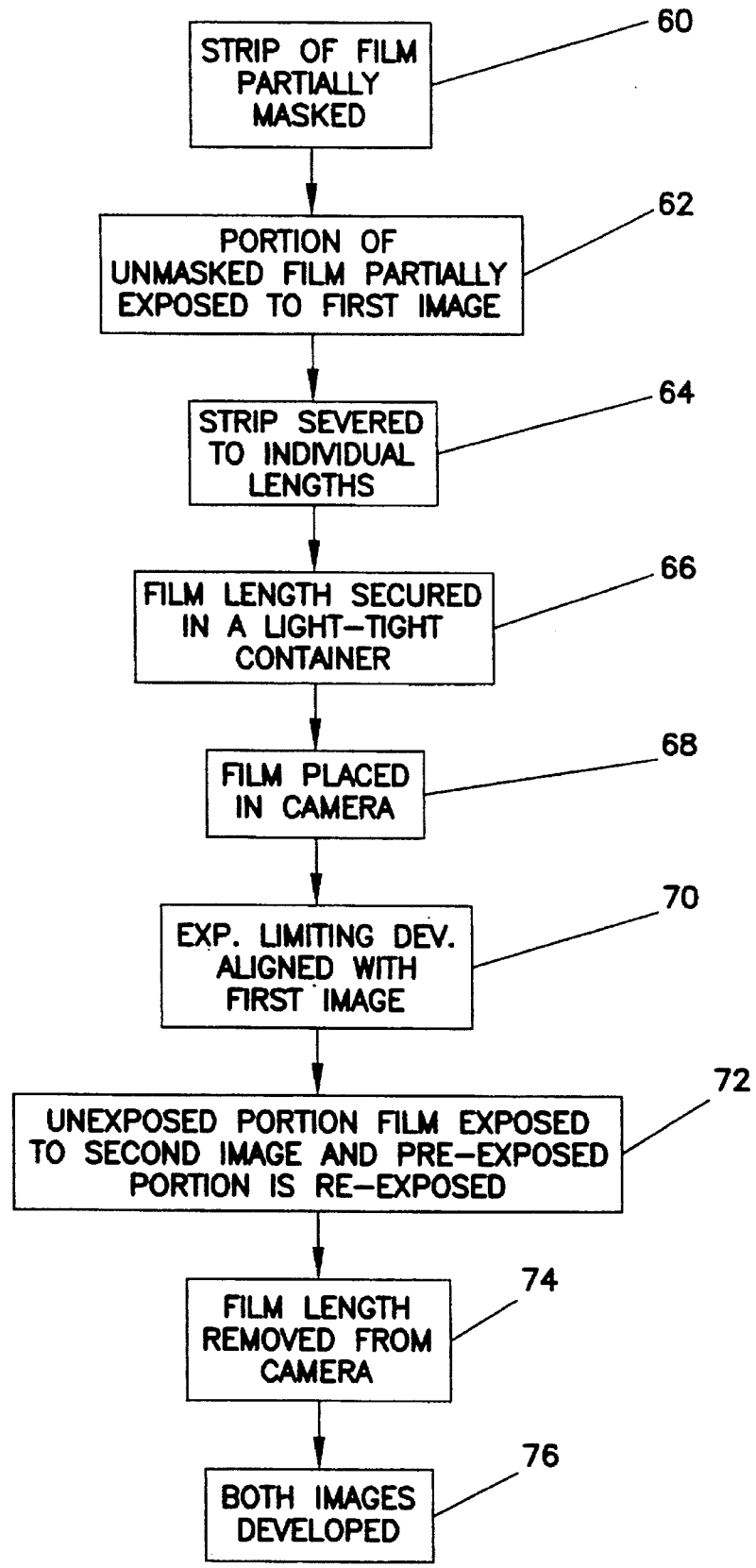
FIG. 4 is a block diagram illustrating the sequence of steps required to produce a smoothly blended composite photograph according to this invention.

FIG. 4 illustrates the sequence of steps required to produce a relatively smoothly blended composite photograph according to this invention. Initially, at 60 the film 25 is partially masked in a light-tight manner by positioning an opaque cover (not shown) between the lens 44 and the portion 24 of the film 25 that will later capture the second or target image. Next, at 62 the unmasked portion 22 of the frame 23 is subjected to a partial exposure of the first image. This process is repeated for each frame 23 of the film 25. At 64, the film 25 is cut into standard lengths i.e., to produce 12, 15, 18, 24, 27 or 36 frames 23 for each length of film 25. At 66, each length of film 25 is then encased in a light-tight container 26 prior to insertion into a camera 100 at 68. The film 25 is loaded into the camera 100 so that at 70, a non-opaque exposure limiting device 20 is positioned between the camera lens 44 and the first image on the film 25. Then at 72, the unexposed portion 24 of the film 25 is exposed to the target image while simultaneously re-exposing the first image. Step 72 is repeated for the length of the film 25 prior to removal at 74. In the case of a disposable camera 100 the film 25 is not removed at 74, instead the camera 100 and film 25 are sent to the developer at 76. At 76, the film 25 is the developed in a conventional manner.

Figure 5A:
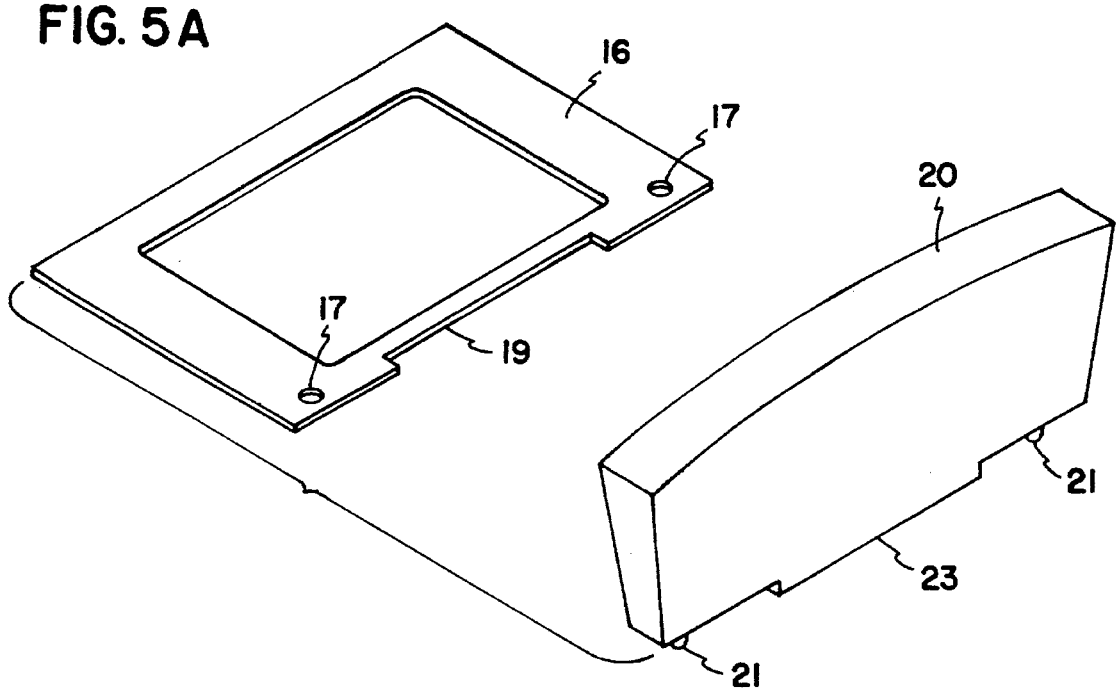
FIG. 5A is an exploded view of the exposure limiting device.

FIG. 5A is an exploded view of the exposure limiting device 20 and the support bracket 16. The support bracket 16 has a combination of spaced-out pin holes 17 and cut-outs 19 that correspond to pegs 21 and teeth 23 at the narrow end 27 of the translucent diffuser 20 to secure the bracket 16 and diffuser 20 together.

The translucent diffuser 20 is wedge shaped and attaches to the support bracket 16 by means of a friction fit between the pin holes 17 and cut-outs 19 of the support bracket 16 with the pegs 21 and teeth 23 at the narrow end 27 of the diffuser 20. When the diffuser 20 is affixed to the support bracket 16, the wide end 29 of the diffuser 20 is adjacent to the film 25 and covers the pre-exposed area 22 of the film 25.

Figure 5B:
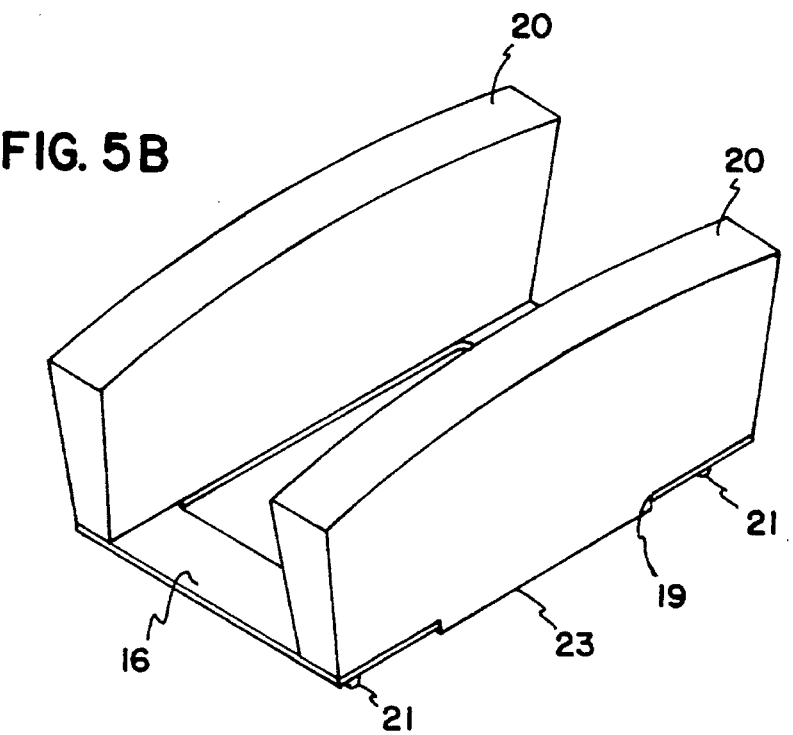
FIG. 5B is a perspective view of the exposure limiting device with multiple translucent diffusers.

FIG. 5B is a perspective view of the exposure limiting device with multiple translucent diffusers 20. Each translucent diffuser 20 is attached to the same support bracket 16. The diffusers 20 are attached to the support bracket 16 by fitting the spaced-out pin holes 17 and cut-outs 19 on the support bracket 16 with the pegs 21 and teeth 23 on the diffusers 20 in the same manner described in FIG. 5A.

Figure 6A:
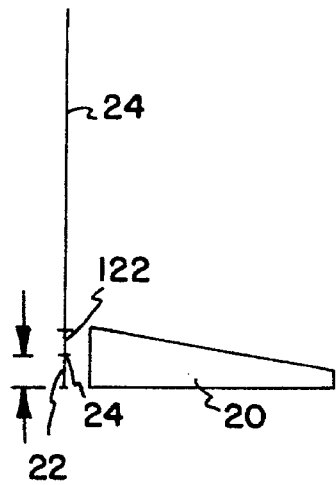
FIG. 6A and 6B are block diagrams illustrating the blending effect of the exposure limiting device.
Figure 7A:
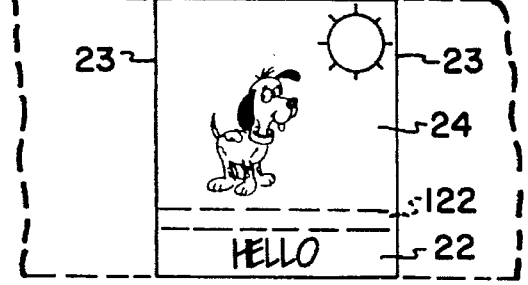
FIG. 7A and 7B are block diagrams of a frame of film illustrating the blending effect of the exposure limiting device configurations shown in FIG. 6A and 6B, respectively.

FIG. 6A is block diagram illustrating the blending effect of the exposure limiting device 20. In this arrangement the exposure limiting device 20 overlaps not only the pre-exposed area 22 of the film 25, but also covers part of the unexposed area 24. This creates a substantially smooth blend between the two images by creating a zone of overlap 122 (see FIG. 7A). The zone of overlap 122 washes out any visible demarcation between the two images.

Figure 6B:
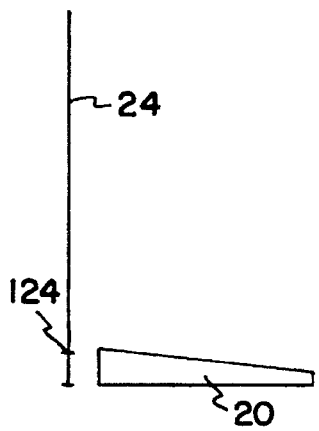
Figure 7B:
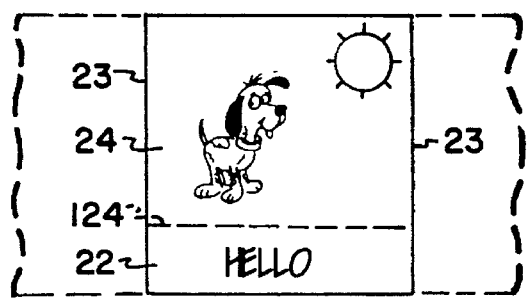
Figure 8A:
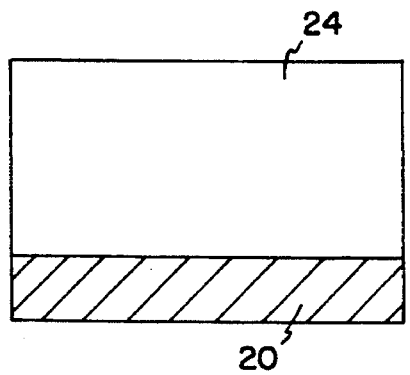
FIGS. 8A, 8B, 8C, 8D, 8E and 8F are block diagrams of various exposure limiting devices of different sizes and shapes.
Figure 8B:
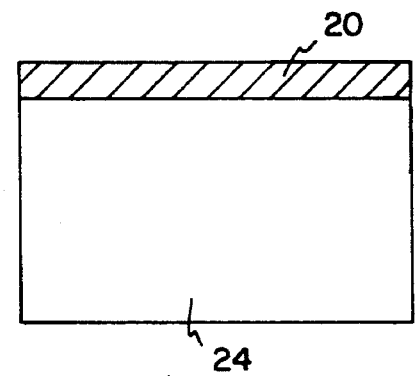
Figure 8C:
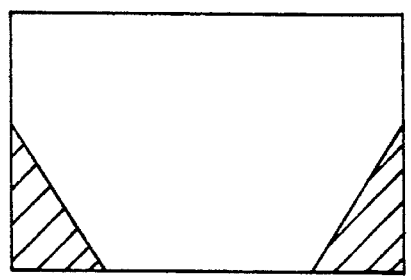
Figure 8D:
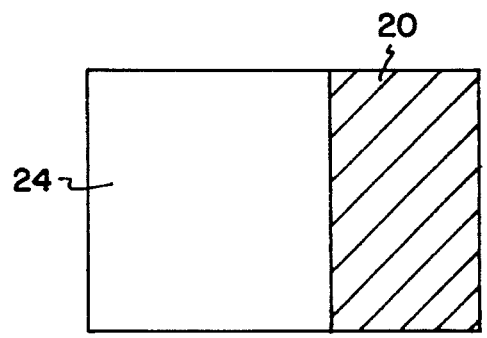
Figure 8E:
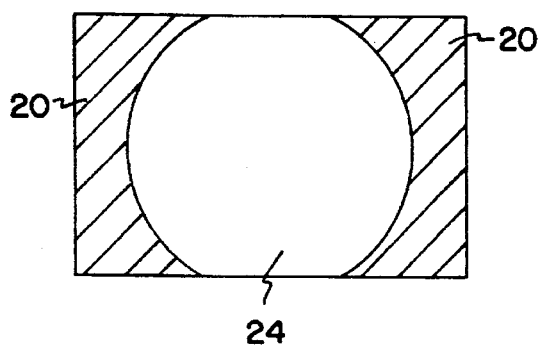
Figure 8F:
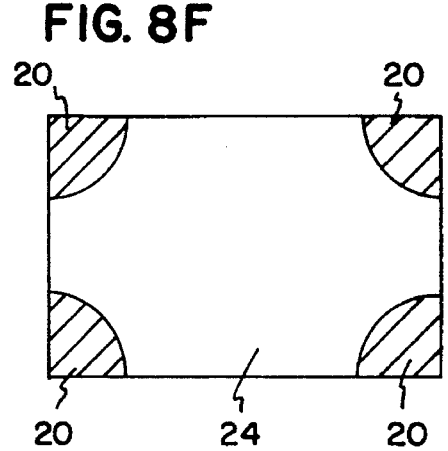

FIG. 6B is block diagram illustrating another use of the exposure limiting device 20 to create a relatively smooth blending effect. The boundary 124 (see FIG. 7B) where the two images meet is washed out by only partially masking out the light. As the distance from the boundary of the two images 124 to the bottom edge of the film 25 increases, the the exposure limiting device 20 becomes stronger because of its wedge shape. The wedge shape of the diffuser creates a wash-out effect by incrementally decreasing the intensity of the exposure at the boundary 124 to the bottom of the pre-exposed area 24 of the film 25. This design results in a relatively smooth blending of images. This effect is not possible with the masking described in the prior art. Masking does not allow re-exposure of the pre-exposed area 24 or varying the degree of re-exposure the pre-exposed area 24 receives.

FIG. 8 is a block diagram of various exposure limiting devices 20 of different sizes and shapes. The translucent diffuser 20 may also be partly non-opaque and partly opaque to correspond to the desired amount of re-exposure required for the first image. The translucent diffuser 20 may also be embodied in shapes other than a wedge. For example, the diffuser 20 can be rectangular (see FIG. 8A, 8B and 8D), curved (see FIG. 8F), diagonal positioned across the corners (see FIG. 8C), circular (see FIG. 8E), or any number of shapes that may cover only a portion of the total area comprising the frame.

This invention may be embodied in any number of variations other than the ones described. For instance, there may be more than one area pre-exposed before the second exposure is effected. Thus, one pre-exposure could be at the top of the film, and a second pre-exposure may be at the sides or bottom of the film.

This invention includes recent advances with cameras and film known as "Advanced Photo System" (trademark). Such systems, such as the KODAK ADVANTix System (trademark), include a camera and film capable of storing and reading photographic information to and from the film. The photographic information can be used for determining whether a particular frame of the film has been exposed as well as desired picture size. The film has the ability within its composition and structure, together with a camera having the appropriate sensors and other features, to determine alignment with the exposure aperture frame. Examples of camera and film incorporating Advanced Photo System (trademark) technology include the KODAK ADVANTiX (trademark) 4100 IX Zoom Camera and the KODAK ADVANTiX (trademark) 100, 200 or 400 film as well as cameras and film from other manufacturers such as Fuji and AFGAR.

This invention also extends to other methods of recording first exposed images or captions on the film such as through use of electronic means including digital computers and engraving. Using electronic means such as digital computers images can be generated on a computer before being recorded onto the film. This allows for a great variety of images to be produced on the film as well as producing a high quality image.

The invention herein encompasses other embodiments of the non-opaque exposure limiting device where the support bracket and the translucent diffuser are manufactured as a single piece or affixed together by other means.

The non-opaque exposure limiting device may include only one of the two components, either the supporting bracket or the translucent diffuser. If the supporting bracket is itself the exposure limiting device it would be translucent thereby permitting re-exposure of the first image. If the translucent diffuser is itself the exposure limiting device it may be affixed directly to the exposure aperture housing or manufactured as part of the exposure aperture frame or housing.

The translucent diffuser can be manufactured to permit varying degrees of light to pass to the first image. The diffuser can reduce the light intensity between about one and two fStop depending upon its density.

The translucent diffuser can be manufactured from a variety of materials in the nature of acrylic which might include plexiglass.

The exposure limiting device and film can be integrated in any number of ways. The exposure limiting device can be part of the film itself when added as a top layer of the film or as part of a film cassette for use in ready-to-use cameras, e.g., using 110 or 126 type film cassettes. The critical elements being the position of the exposure limiting device between the film and the lens and the use of the exposure limiting device to re-expose the pre-exposed area of the film.

Various means for aligning the pre-exposed frame with the exposure aperture frame within the scope of this invention include but are not limited to alignment at the time the film is loaded into the camera. This is accomplished by aligning a mark fixed on the exposure aperture frame with a mark on the film. Alignment can also be done during assembly of the camera and the film.

Means for advancing the film include, but are not limited to battery powered mechanisms, manual mechanisms or a combination of the two.

While certain preferred embodiments of the present invention have been disclosed in detail, it is to be understood that various modifications may be adopted without department from the spirit of the invention or scope of the following claims.

What is claimed:

1. A photography apparatus comprising:
   a length of pre-exposed film for photographic exposure, the film having a first exposed area and an unexposed area for exposure to a target image, the unexposed area being the portion of the film not containing the first exposed area;
   a camera having two cavities, one cavity being for holding the pre-exposed film prior to re-exposure and one cavity being for holding the film after re-exposure, an exposure aperture frame located between the cavities across which the film is positioned for exposure to the target image, the target image being focused by a lens onto the film; and
   means for partially reducing an exposure intensity to the first exposed area on the film thereby permitting re-exposure of the first exposed area when the target image is exposed to the unexposed portion of the film.

2. A photography apparatus as claimed in claim 1 wherein the exposure intensity reducing element includes a non-opaque exposure limiting device positioned between the lens and the first exposed area of the film.

3. A photography apparatus as claimed in claim 2 wherein the non-opaque exposure limiting device includes a translucent diffuser.

4. A photography apparatus as claimed in claim 3 wherein the translucent diffuser is selected to be at least any acrylic or plexiglass.

5. A photography apparatus as claimed in claim 3 including an opaque bracket positioned between the lens and the film to at least partly define the exposure area around the borders of the frames of the film, the translucent diffuser being wedge shaped and being attached to the opaque bracket at a narrow end, a wide end of the diffuser being adjacent to the film and substantially covering the first exposed image thereby permitting partial re-exposure of the first exposed area through the diffuser when the target image is exposed to the unexposed portion of the film.

6. A photography apparatus as claimed in claim 2 wherein the non-opaque exposure limiting device includes a plurality of diffusers attached at different locations on the opaque support bracket thereby permitting re-exposure of several pre-exposed areas of the film when the target image is exposed to the unexposed portion of the film.

7. A photography apparatus as claimed in claim 2 wherein the non-opaque exposure limiting device is affixed with the exposure aperture frame or the exposure aperture housing of the camera.

8. A photography apparatus as claimed in claim 2 wherein the non-opaque exposure limiting device is affixed with the film.

9. A photography apparatus as claimed in claim 1 wherein the camera is disposable.

10. A photography apparatus as claimed in claim 2 wherein the camera is disposable.

11. A photography apparatus as claimed in claim 3 wherein the camera is disposable.

12. A photography apparatus as claimed in claim 4 wherein the camera is disposable.

13. A photography apparatus as claimed in claim 5 wherein the camera is disposable.

14. A photography apparatus as claimed in claim 7 wherein the camera is disposable.

15. A photography apparatus as claimed in claim 1 wherein the film and the means for partially reducing the exposure intensity to the first exposed image on the film are integrated into a single film container when the film container is being pre-assembled.

16. A photography apparatus comprising:
    a length of pre-exposed film for photographic exposure, the film having a first exposed area and an unexposed area for exposure to a target image, the unexposed area being the portion of the film not containing the first exposed area;
    a camera having two cavities, one cavity being for holding the pre-exposed film prior to re-exposure and one cavity being for holding the film with a take-up spool after re-exposure, an exposure aperture frame located between the cavities, means for aligning the film with the exposure aperture frame for exposure to the target image, the target image being focused by a lens onto the film, and means for advancing the film whereby the film traverses from the exposure aperture frame to the take-up spool after re-exposure; and
    an exposure intensity reducing element for location relative to the first exposed area on the film thereby permitting re-exposure of the first exposed area when the target image is exposed to the unexposed portion of the film.

17. A photography apparatus as claimed in claim 16 wherein the means for aligning the films across the exposure aperture frame includes aligning the means for partially reducing an exposure intensity with the first exposed image of the film.

18. A photography apparatus as claimed in claim 17 wherein the means for aligning the film across the exposure aperture frame occurs when the film is loaded into the camera by lining up a mark on the film with a corresponding mark on the exposure aperture frame.

19. A photography apparatus as claimed in claim 17 wherein the means for aligning the film across the exposure aperture frame includes a sensor of the camera for determining the position of a pre-exposed frame of the film relative to the exposure aperture frame and advances the film until the first unexposed frame of the film and the exposure aperture frame are aligned.

20. A photography apparatus as claimed in claim 16 wherein the camera and film are cooperative for permitting storing and reading of photographic information, wherein the film includes the ability within its composition and structure, together with the camera having sensors for determining alignment with the exposure aperture frame.

21. A photography apparatus as claimed in claim 16 wherein the camera is disposable.

22. A photography apparatus as claimed in claim 21 wherein the means for aligning the films across the exposure aperture frame includes aligning the non-opaque exposure limiting device with the first exposed image of the film.

23. A photography apparatus as claimed in claim 22 wherein the means for aligning the films and the exposure aperture frame occurs during assembly of the camera and the film.

24. A photography apparatus comprising:
a length of pre-exposed film for photographic exposure wound around a spool encased in a light-tight container, comprising of a plurality of frames of fixed length, having perforated holes located at the edges of the film running along length of the film and attached to means for advancing the film, a first exposed image contained on an area of the film within a space to be formed as a frame on the film, an unexposed area of each frame of the film being the portion of the film not containing the first exposed image;
a camera having two cavities, one cavity being for holding the pre-exposed film prior to re-exposure and one cavity being for holding the film with a take-up spool after re-exposure, an exposure aperture frame located between the cavities, means for aligning different frames consecutively across the exposure aperture frame for exposure to the target image, the target image being focused by a lens onto the frame of the film, and means for advancing the film whereby the film traverses from the exposure aperture frame to the take-up spool after re-exposure of different frames of the film; and
means for partially reducing an exposure intensity to the first exposed area on the frames of the film thereby permitting re-exposure of the first exposed area on each frame when the target image is exposed to the unexposed portion of the frames of the film.

25. A photography apparatus as claimed in claim 24 wherein the camera is disposable.

26. A camera for creating a composite photograph from multiple exposed images comprising:
two cavities, one cavity being for holding a pre-exposed film prior to re-exposure and one cavity being for holding the film with a take-up spool after re-exposure, an exposure aperture frame located between the cavities, means for aligning the film with the exposure aperture frame for exposure to the target image, the target image being focused by a lens onto the film, and means for advancing the film whereby the film traverses from the exposure aperture frame to the take-up spool after re-exposure; and
an exposure intensity reducing element for location relative to a first exposed image on the first exposed area of the film thereby permitting re-exposure of the first exposed area when the target image is exposed to the unexposed portion of the film.

27. A camera as claimed in claim 26 wherein the camera is disposable.

28. A camera as claimed in claim 26 wherein the exposure intensity reducing element includes a translucent diffuser.

29. A camera as claimed in claim 26 wherein the means for aligning the films across the exposure aperture frame includes aligning the non-opaque exposure limiting device with the first exposed image of the film.

30. A camera as claimed in claim 26 wherein the means for aligning the film across the exposure aperture frame includes the film having the ability within its composition and structure, together with the camera having sensors for determining alignment with the exposure aperture frame.

31. A method for producing a double exposed composite image on a film comprising the steps of:

(a) furnishing a length of the film and dividing the length into a plurality of film films of fixed length;
(b) masking a portion of the film frame by positioning an opaque cover between a lens and the portion of the film frame in a light-tight manner whereby the portion remains unexposed,
(c) subjecting an unmasked portion of the frame to a low intensity exposure of a first image so that light from the image strikes the film frame through the lens,
(d) repeating step (c) to each frame of the film for the length of the film,
(e) using a spool encased in a container to wind-up the pre-exposed film onto the spool in a light-tight manner after each successive frame is exposed to the first image for the length of the film,
(f) inserting the pre-exposed film in the container into a cavity adjacent to an exposure aperture frame which contains a lens,
(g) unspooling the film from the container and aligning the film with the exposure aperture frame,
(h) positioning a non-opaque exposure limiting element between the lens and the pre-exposed portion of film,
(i) re-exposing the film to a target image so that the target image is focused by the lens onto the unexposed portion of the film,
(j) repeating step (i) for length of the film by advancing each successive frame of the film from the exposure aperture frame to a wind-up spool located in a cavity adjacent the aperture frame and opposite from the cavity holding the pre-exposed film, and
(k) simultaneously developing the images on the films to produce a composite image.

32. A method for producing a double exposed composite image on a film comprising the steps of:
(a) inserting a container having a partially pre-exposed film into a cavity adjacent to an exposure aperture frame containing a lens,
(b) unspooling the film from the container and aligning the film with the exposure aperture frame,
(c) positioning a non-opaque exposure limiting element between the lens and the pre-exposed portion of film,
(d) re-exposing the film to a target image so that the target image is focused by the lens onto the unexposed portion of the film,
(e) repeating step (d) for length of the film by advancing each successive frame of the film from the exposure aperture frame to a wind-up spool located in a cavity adjacent the aperture frame and opposite from the cavity holding the pre-exposed film, and
(f) simultaneously developing the images on the films to produce a composite image.

33. Apparatus for partially reducing an exposure intensity to a first exposed image on a first exposed area of a film, and for permitting re-exposure of the first exposed area when a target image is exposed to an unexposed portion of the film, the apparatus being for use in a camera having two cavities, one cavity being for holding the pre-exposed film prior to re-exposure and one cavity being for holding the film with a take-up spool after re-exposure, an exposure aperture frame located between the cavities, a lens, means for aligning the film with the exposure aperture frame for exposure to the target image, the target image being focused by the lens onto the film, and means for advancing the film whereby the film traverses from the exposure aperture frame to the take-up spool after re-exposure, comprising:

a non-opaque exposure limiting element for location between the exposure aperture frame and the lens.

34. An apparatus as claimed in claim 33 wherein the camera is disposable.

35. A film comprising a fixed length for photographic exposure wound around a spool encased in a light-tight container, perforated holes located at an edge of the film running along length of the film and for attachment to means for advancing the film in a camera, the film including a first exposed image contained on an area of the film within a space to be formed as a frame on the film, such image being for re-exposure in a camera, and an unexposed area of each frame of the film being the portion of the film not containing the first exposed image.

36. A film as claimed in claim 35 wherein the camera and film are cooperative for permitting storing and reading of photographic information, wherein the film includes the ability within its composition and structure, together with the camera having sensors for determining alignment with the exposure aperture frame.

37. A film as claimed in claim 35 wherein the film is for use in a disposable camera.

* * * * *